(12) United States Patent
Yu

(10) Patent No.: US 8,931,643 B2
(45) Date of Patent: Jan. 13, 2015

(54) POWDER SIFTING DEVICE

(71) Applicant: Chun-Hsiung Yu, Taipei (TW)

(72) Inventor: Chun-Hsiung Yu, Taipei (TW)

( * ) Notice: Subject to any disclaimer, the term of this patent is extended or adjusted under 35 U.S.C. 154(b) by 0 days.

(21) Appl. No.: 13/934,305

(22) Filed: Jul. 3, 2013

(65) Prior Publication Data
US 2014/0097128 A1   Apr. 10, 2014

(30) Foreign Application Priority Data
Oct. 9, 2012   (TW) .............................. 101219464 U

(51) Int. Cl.
*B07B 1/02*   (2006.01)
*A47J 43/22*   (2006.01)
(52) U.S. Cl.
CPC ....................................... *A47J 43/22* (2013.01)
USPC ...... 209/389; 209/374; 209/417; 222/189.03; 222/189.05
(58) Field of Classification Search
USPC .......................... 209/370, 374, 385, 389, 417; 222/189.02, 189.04, 189.05
See application file for complete search history.

(56) References Cited

U.S. PATENT DOCUMENTS

| | | | | | |
|---|---|---|---|---|---|
| 213,205 | A | * | 3/1879 | Johnson | 209/245 |
| 351,203 | A | * | 10/1886 | Reese | 209/357 |
| 1,471,361 | A | * | 10/1923 | Sarles | 209/372 |
| 1,593,312 | A | * | 7/1926 | Shappell | 209/251 |
| 2,126,982 | A | * | 8/1938 | Andrews et al. | 209/358 |
| 2,393,453 | A | * | 1/1946 | Bailey | 209/251 |
| 2,674,375 | A | * | 4/1954 | Clay | 209/251 |
| 2,866,552 | A | * | 12/1958 | Richman | 209/255 |
| 2,967,619 | A | * | 1/1961 | Glenny | 209/357 |
| 4,271,011 | A | * | 6/1981 | Spencer et al. | 209/236 |

* cited by examiner

*Primary Examiner* — Joseph C Rodriguez
(74) *Attorney, Agent, or Firm* — Myers Bigel Sibley & Sajovec, P.A.

(57) ABSTRACT

Disclosed is a powder sifting device comprising a housing and a frame, the housing has a first opening communicating a second opening on which a screen is provided to form a receiving space delimited by the first and the second opening; the frame, that is received in the receiving space, is provided with a holding part at one side adjacent to the first opening and provided with a sweeping element proximately covering on the screen at other side, wherein the frame is driven by the holding part to rotate within the receiving space, and the sweeping element is moved along with the holding part to sweep over the screen according to the present invention, so that the effort-saving and easy-operation powder sifting device is obtained.

7 Claims, 10 Drawing Sheets

POWDER SIFTING DEVICE

FIELD OF THE INVENTION

The present invention relates to a powder sifting device, and more particularly to a powder sifting device with the properties of effort-saving and easy-operation.

BACKGROUND OF THE INVENTION

Agriculture products are the daily necessities in our livelihood such that is made from rice and flour. The product processed from flour is, for example, noodles, which is indispensable to our life as meals in common. Since the flour is so important in our daily life, the related instruments for processing flour powder is popular in the market, which is named for example as a powder (flour) sifter or a sieve, which are used for filtering the powder of flour, powder of potato flour, powder of sugar or the like, for filtering the debris or the coarse-grained particle.

The conventional powder sifter, as shown in FIG. 1, is a powder sifter device 1 that has a frame 10 and a screen 11 provided at the bottom of the frame 10. By the hole 111 in the screen 11, the powder will be filtering and debris or coarse particle of powder will be left on the screen 11 when being passed through the hole 111.

However, when the conventional powder sifter device 1 is used, if there is too much powder poured, the screen 11 may be blocked by powder. Although this drawback can be overcome by shaking the whole powder sifter device 1 to pass the powder through the screen 11 smoothly, the situation that the powder is blocked by the screen 11 is always happening, and is still a subject to be solved.

Moreover, there is another kind of powder sifter device 2 in the market, as shown in FIGS. 2A & 2B, where the powder sifter device 2 includes a housing 20, a screen 21 provided on the bottom side of the housing 20, and a receiving space 22 is delimited by the housing 20 and screen 21, the outer surface of the housing 20 is provided with a handle 201, and the pressing member 202 is provided adjacent to the handle 201 and connected to a rotating member 23 which is provided at the bottom of the receiving space 22. When the powder sifter device 2 is used, a user holds the handle 201, and presses the pressing member 202 for driving the rotating member 23 provided on the bottom of the receiving space 22 for being rotated, so that the powder will be poured out through the screen 21. However, this structure is operated by one hand, and it needs to press continuously to pour out the powder, which may lead user feel sore in hand and can not operate for a long time Moreover, it requires strenuous effort to pressing it, which is not convenient for use and is difficult to sift the powder rapidly.

As the mentioned above, the conventional technique have the drawbacks below:
1. It requires strenuous effort to operate.
2. It is not convenient to use.
3. The rate of pouring the powder is too slow.

Therefore, the present invention is to solve the above drawbacks and problems of prior art.

SUMMARY OF THE INVENTION

Accordingly, the major purpose of the present invention is to provide an easy-operation and effort-saving powder sifting device to improve the drawbacks mentioned above.

The secondary purpose of the present invention is for providing a highly convenient powder sifting device.

To achieve the purpose mentioned above, the present invention provides a powder sifting device comprising a housing and a frame, the housing has a first opening communicating with a second opening on which a screen is provided to form a receiving space delimited by the first and the second opening, the frame, that is received in the receiving space, is provided with a holding part at one side adjacent to the first opening and provided with a sweeping element proximately covering on the screen at the other side, wherein the frame is driven by the holding part to rotate within the receiving space, and the sweeping element is moved along with the holding part to sweep over the screen.

By using the powder sifting device of the present invention, the powder is poured into the receiving space of the housing from the first opening, then the frame is rotated within the receiving space driven by the holding part provided at one side, and the sweeping element is moved along with the holding part to sweep powder over the screen. Because the sweeping element proximately covers on the screen and is moving back and forth on the screen, the powder can be poured out smoothly through the screen. Thereafter, the easy-operation and effort-saving powder sifting device is obtained.

BRIEF DESCRIPTION OF THE DRAWINGS

The structure and the technical means adopted by the present invention to achieve the above and other objects can be best understood by referring to the following detailed description of the preferred embodiments and the accompanying drawings.

DETAILED DESCRIPTION OF THE PREFERRED EMBODIMENTS

Figure 1:
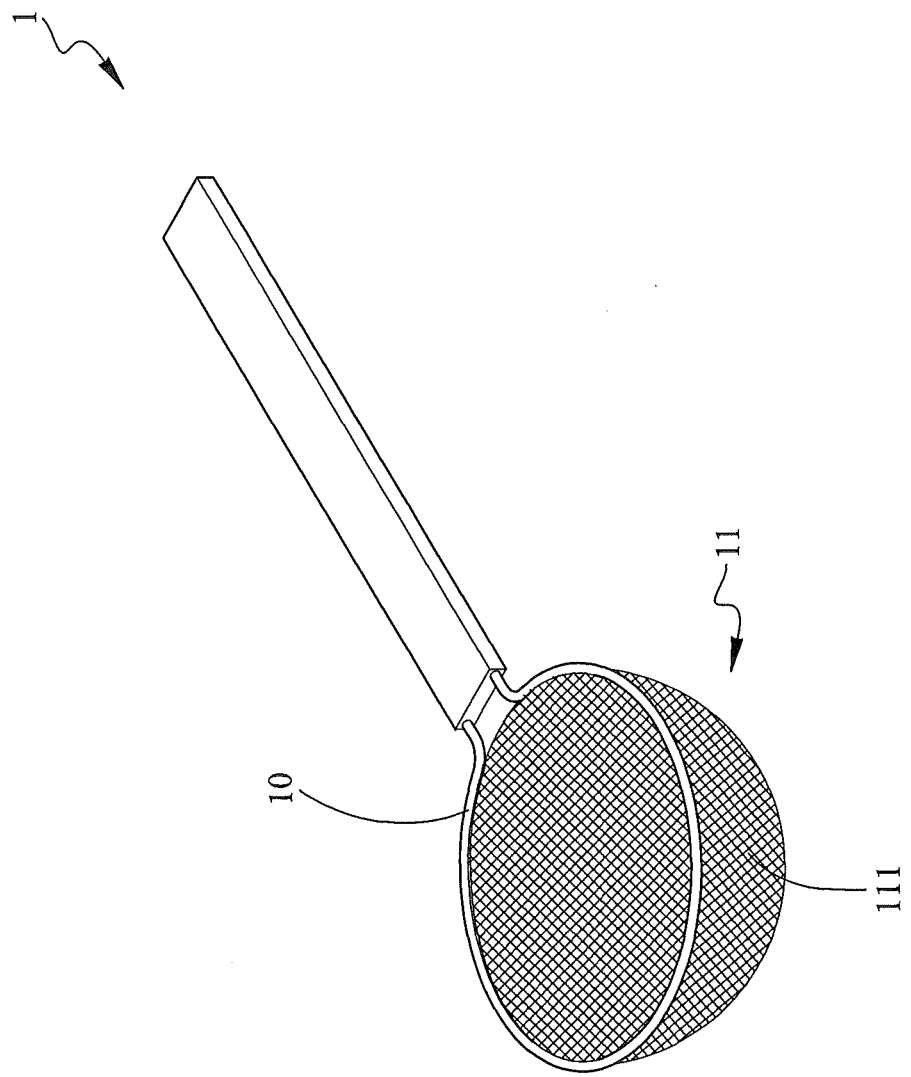
FIG. 1 is an assembling drawing illustrating the conventional powder sifting device.
Figure 2A:
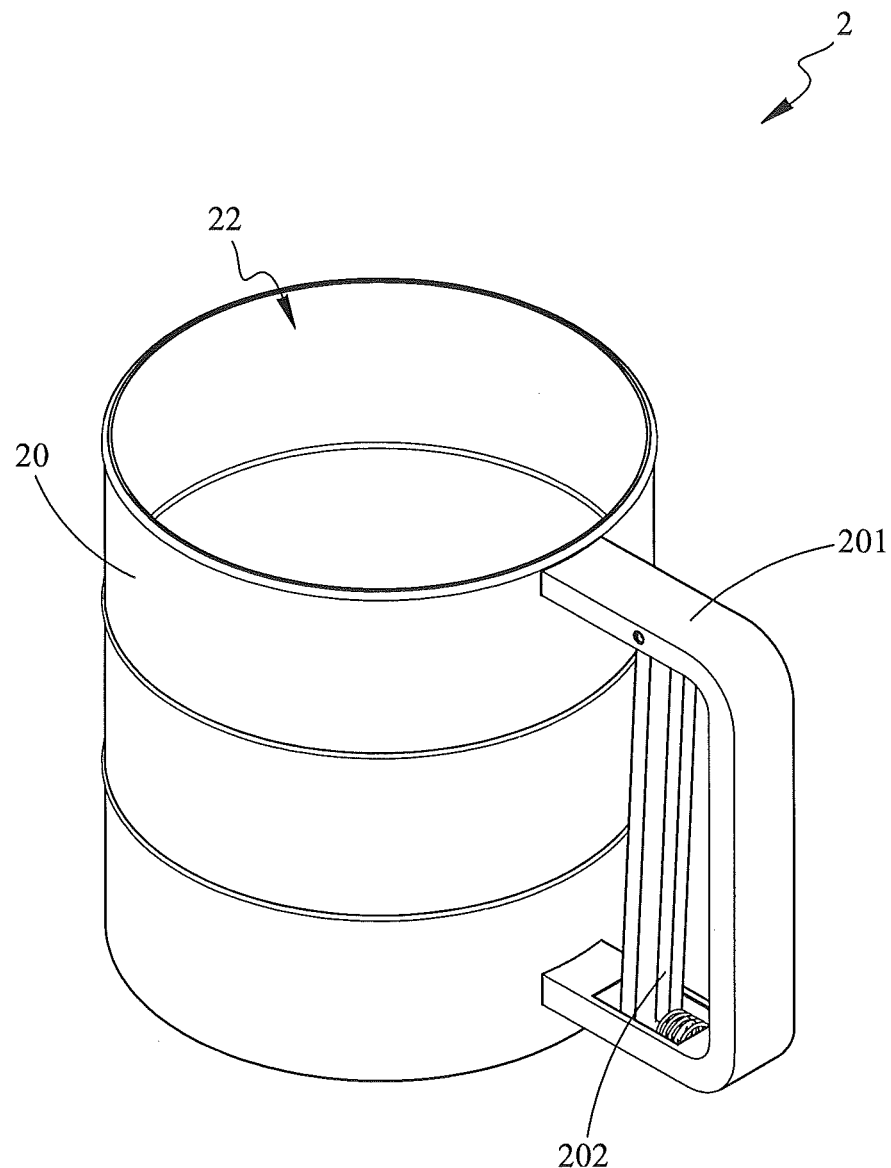
FIG. 2A is assembling drawing illustrating another conventional powder sifting device.
Figure 2B:
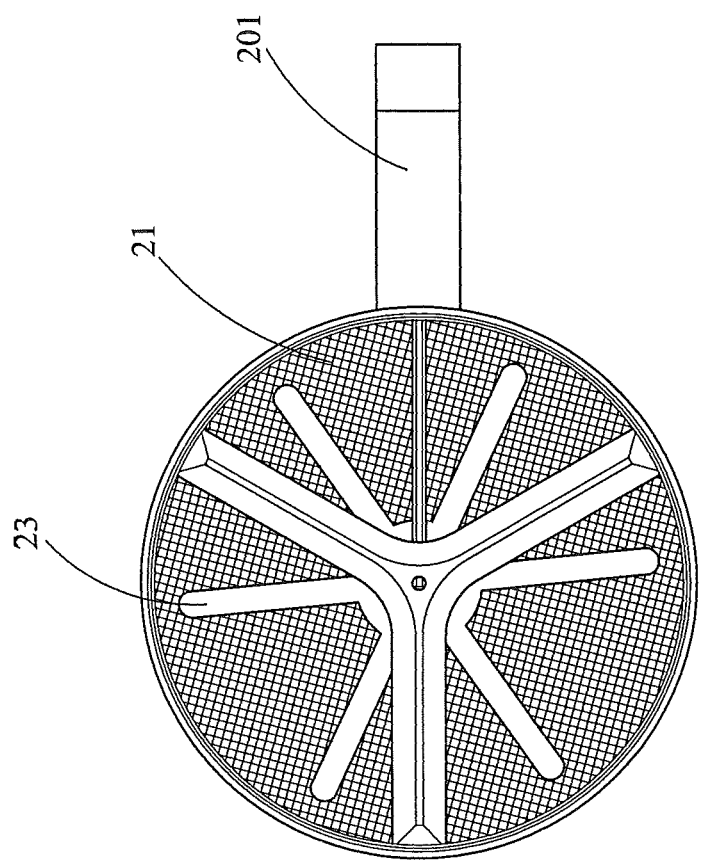
FIG. 2B is plant view of the another conventional powder sifting device.
Figure 3A:
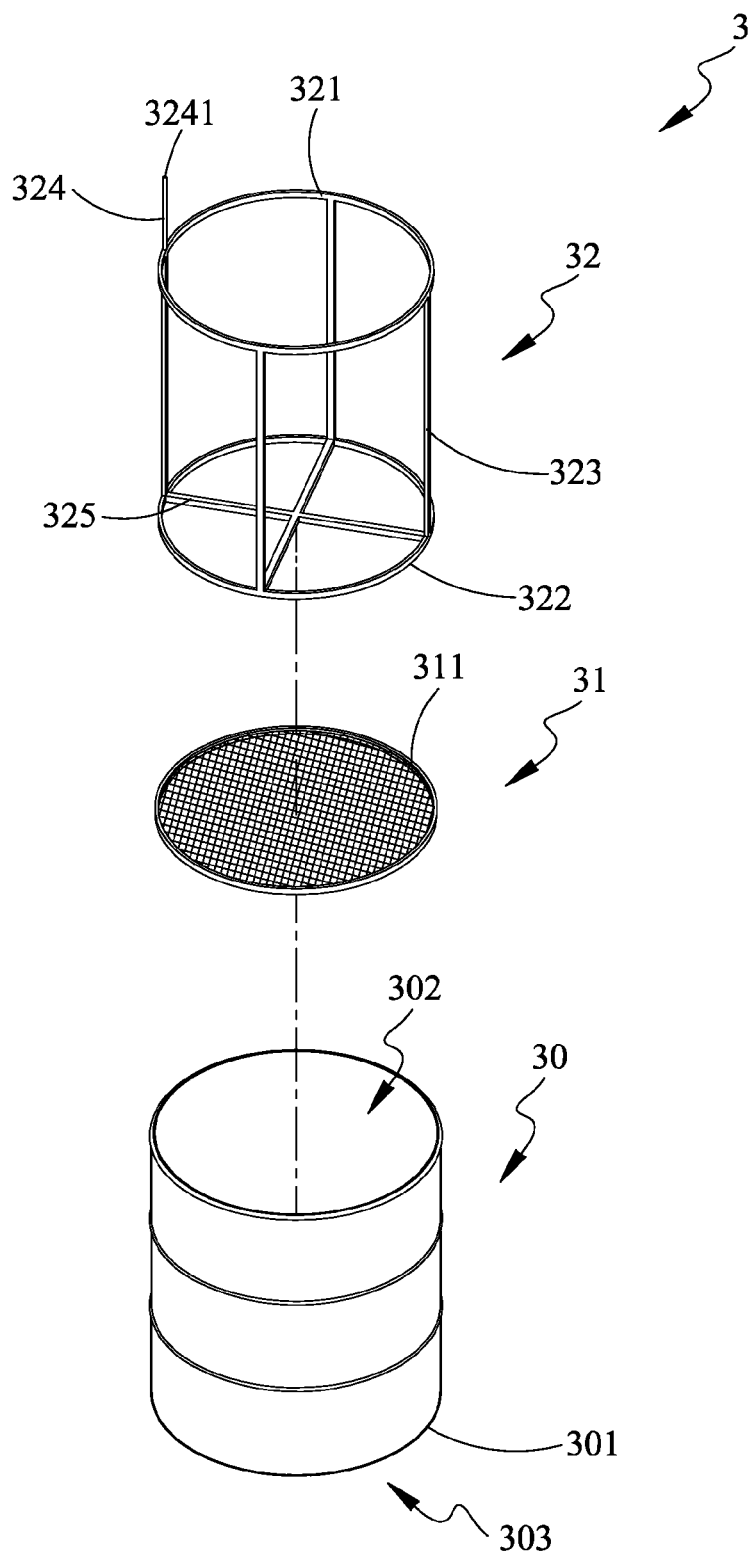
FIG. 3A is explosion diagram illustrating the powder sifting device according to the first embodiment of the present invention.
Figure 3B:
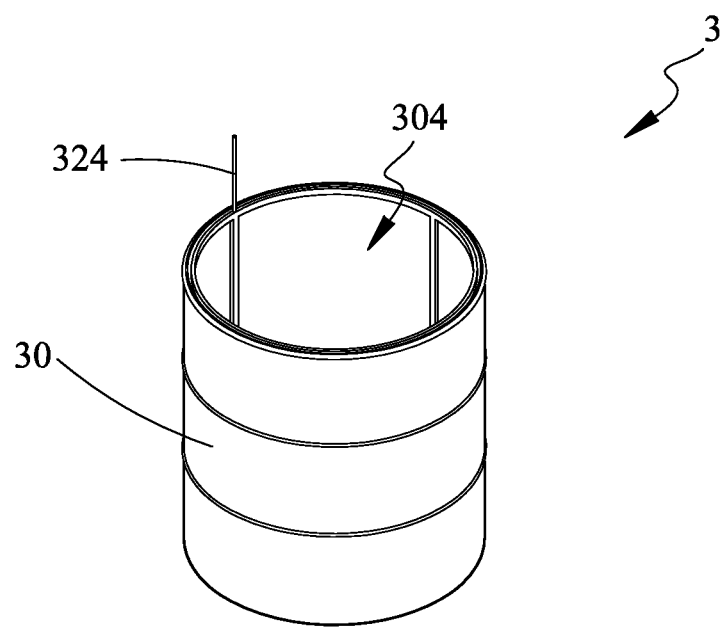
FIG. 3B is assembling drawing illustrating the powder sifting device according to the first embodiment according of the present invention.

Please refer to FIG. 3A to FIG. 3B, which show the explosion diagram and assembling drawing illustrating the powder sifting device according to the first embodiment of the present invention. A powder sifting device 3 comprises a housing 30 and a frame 32, the housing 30 has a first opening 302 communicating with the second opening 303, a screen 31 is provided on the second opening 303, and a receiving space 304 delimited by the first opening 302 and the second opening 303 is formed, wherein a junction part 301 of the housing 30 is provided at a position that supports a coupling part 311, which is provided at the periphery of the screen 31, of the screen 31 to form the receiving space 304. In other words, the housing is provided with a junction part at a periphery position corresponding to a position that connects with the screen connected, the screen is provided at a periphery with a coupling part that is coupled to the junction part to form the receiving space.

The frame 32, which is received within the receiving space 304 of the housing 30, is provided at one side a holding part 324 at a position adjacent to the first opening 302, and is provided at the other side a sweeping element 325 proximately covering on the screen 31, wherein the frame has an upper frame 321, a lower frame 322 and a connecting part 323 connecting between the upper frame 321 and the lower frame 322, the sweeping element 325 is formed extending toward the center of the frame 32 from the lower frame 322, the holding part 324 is provided protruding from the upper frame 321 and has an opening hole 3241 on its top end.

Therefore, according to the structure of the present invention, by using the powder sifting device 3 of the present invention, the powder is poured into the receiving space 304 of the housing 30 from the first opening 302, then user holds the holding part 324 provided at one side of the frame 32, so that the frame 32 driven by the holding part 324 is rotated within the receiving space 304, and the sweeping element 325 is moved along with the holding part 324 to sweep powder over the screen 31. Because the sweeping element 325 proximately covers on the screen 31 and is moving back and forth on the screen 31, the powder can be poured out smoothly through the screen 31, thereafter, the efficacy of easy-operation, fast-sifting powder and effort-saving is obtained.

Figure 4:
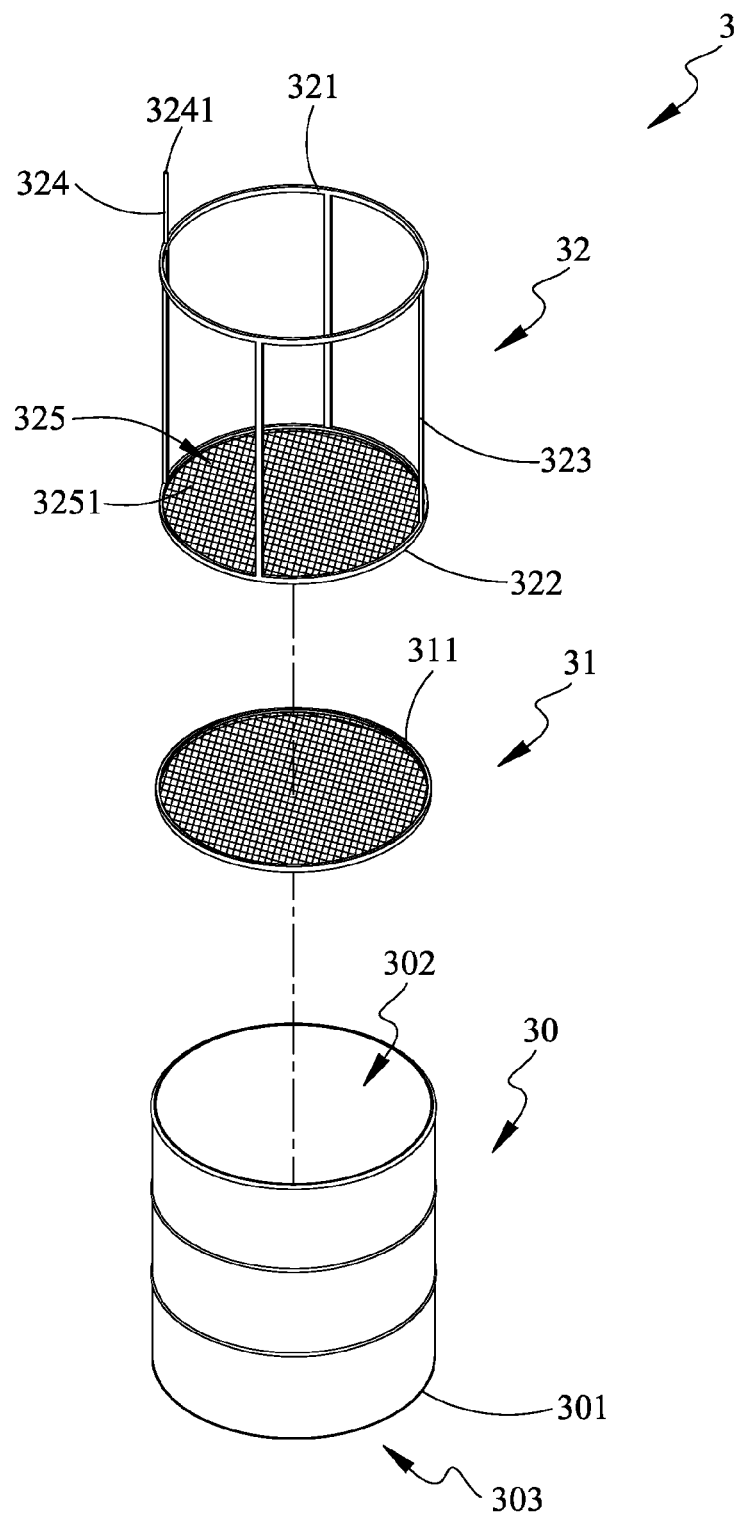
FIG. 4 is explosion diagram illustrating the powder sifting device according to the second embodiment according of the present invention.
Figure 5:
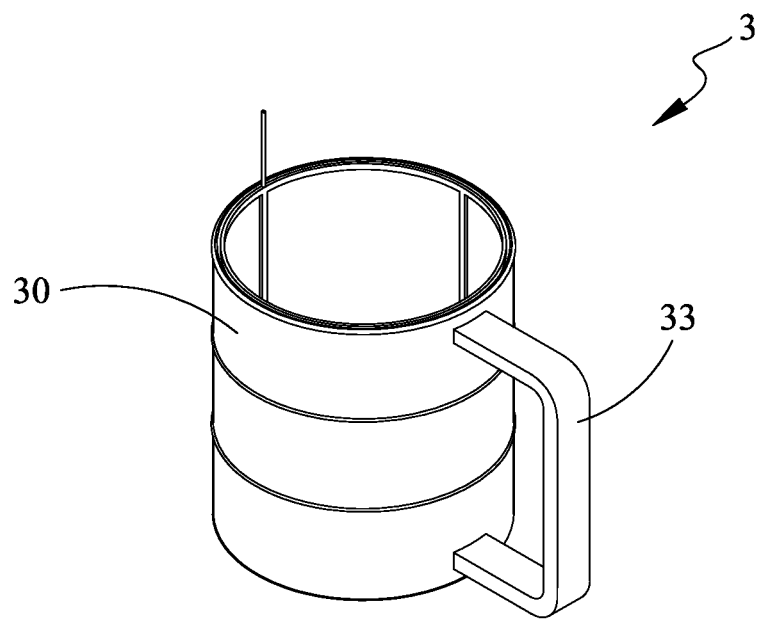
FIG. 5 is assembling drawing illustrating the powder sifting device according to the third embodiment according of the present invention.

Please refer to the FIG. 4, which shows the explosion diagram of the powder sifting device according to the second embodiment of the present invention. The description for the partial elements and the corresponding connection relationship that is the same as the previous powder sifting device mentioned above, will not be repeated for simplicity. The mainly difference therebetween is that the sweeping element 325 is a sweeping-screen. The sweeping-screen is also formed in the bottom of the lower frame 322. Therefore, when the sweeping element 325 is sweeping on the screen 31 back and forth, the particle of the powder can be further fine-grained by the screen of the sweeping-screen Please refer to the FIG. 5, which shows the assembling drawing illustrating the powder sifting device according to the third embodiment of the present invention. The description for the partial elements and the corresponding connection relationship that is the same as the previous powder sifting device mentioned above, will not be repeated for simplicity. The mainly difference therebetween is that the housing 30 has a handle 33 protruding from the outer surface of the housing 30, so that a user can hold the powder sifting device 3 easier.

Figure 6:
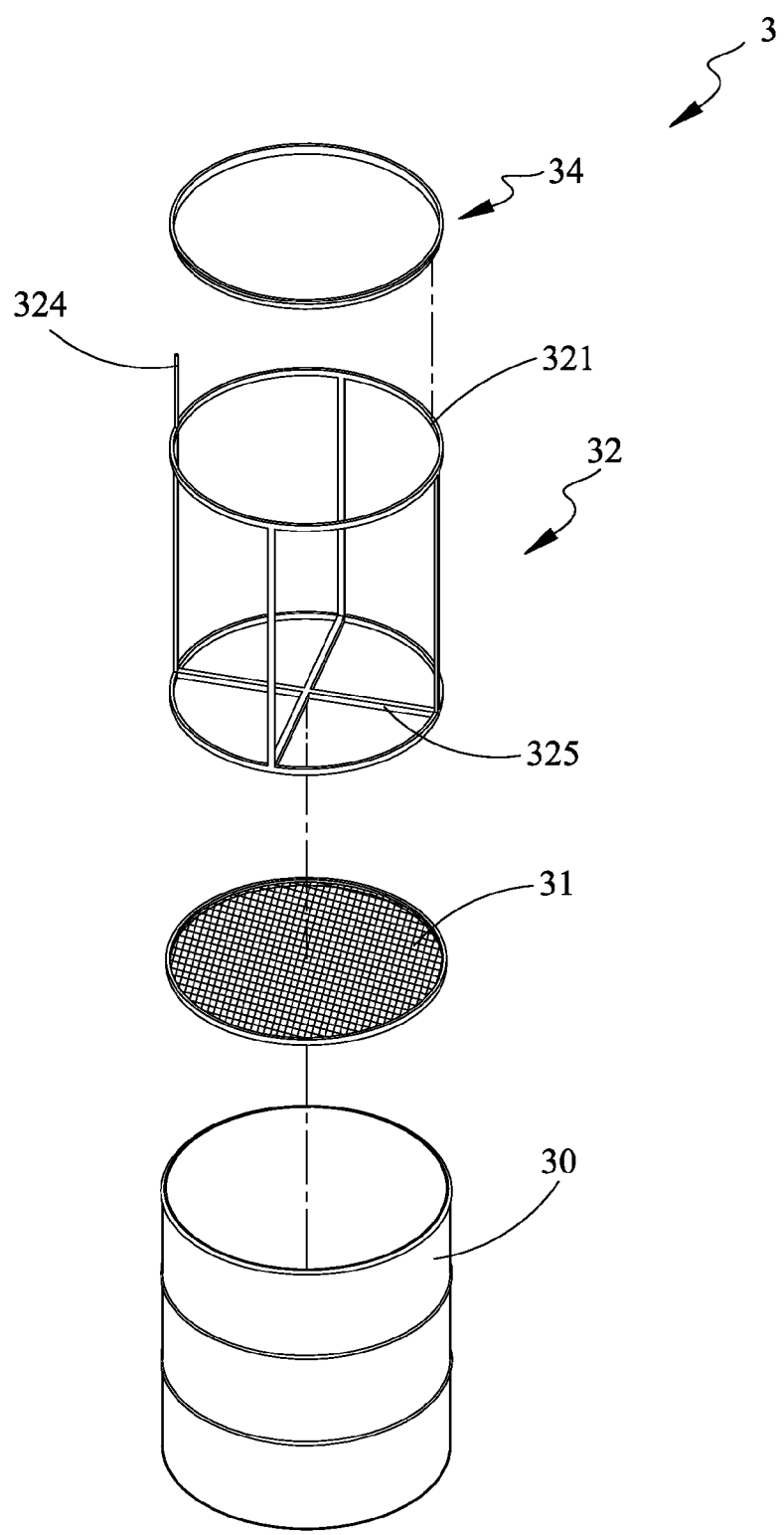
FIG. 6 is explosion diagram illustrating the powder sifting device according to the fourth embodiment according of the present invention.

Please refer to the FIG. 6, which shows the explosion diagram of the powder sifting device according to the fourth embodiment of the present invention. The description for the partial elements and the corresponding connection relationship that is the same as the previous powder sifting device mentioned above, will not be repeated for simplicity. The mainly difference therebetween is that the powder sifting device 3 further comprises a fixing member 34 that covers both on the housing 30 and the upper frame 321 of the frame 32. Therefore, when the frame 32 is received within the housing 30, the connection between the housing 30 and the upper frame 321 can be more secured by the fixing member 34 to prevent each element from being loosed and to secure the connection of the powder sifting device 3 better.

Figure 7A:
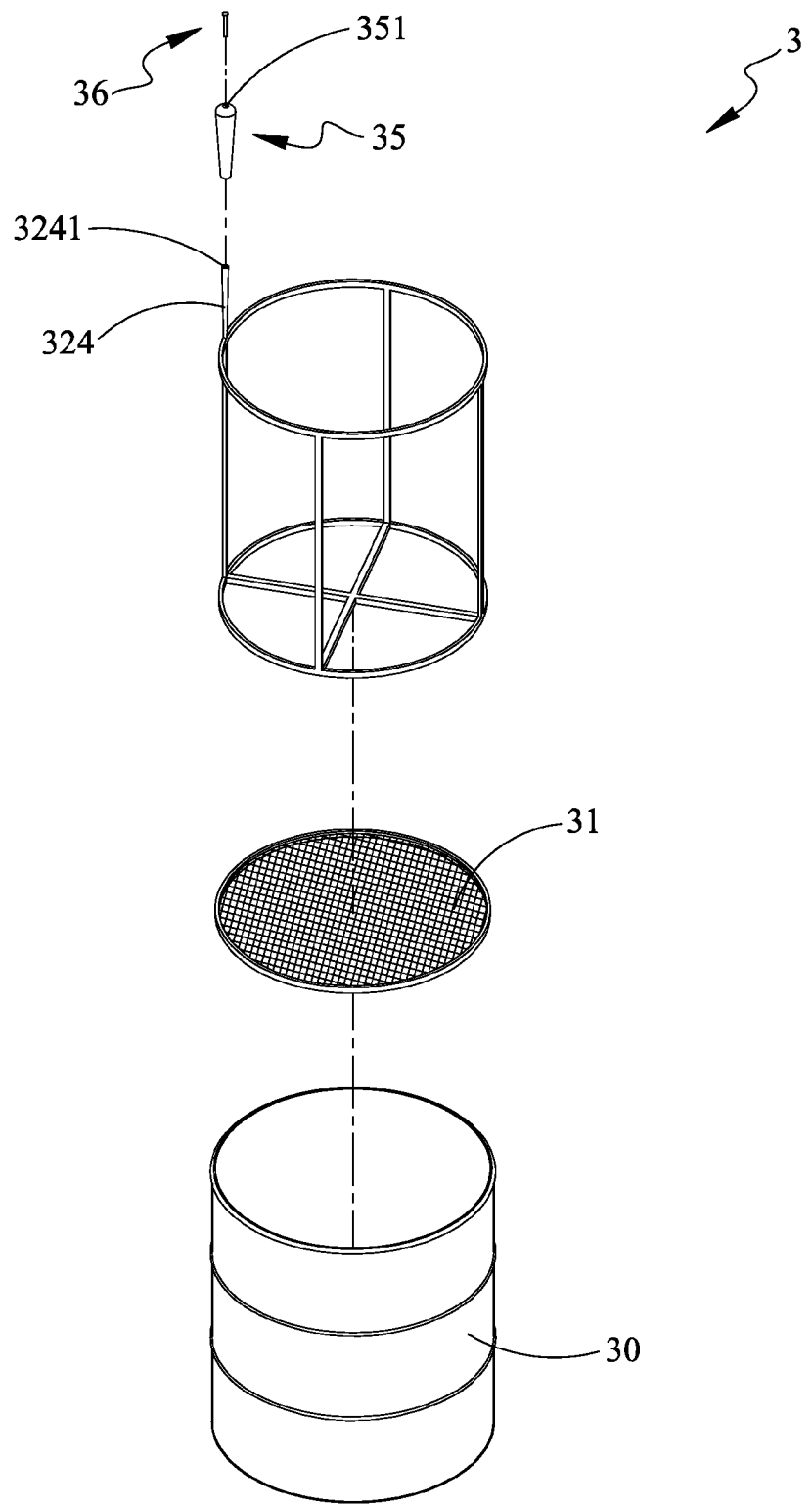
FIG. 7A is explosion diagram illustrating the powder sifting device according to the fifth embodiment according of the present invention.
Figure 7B:
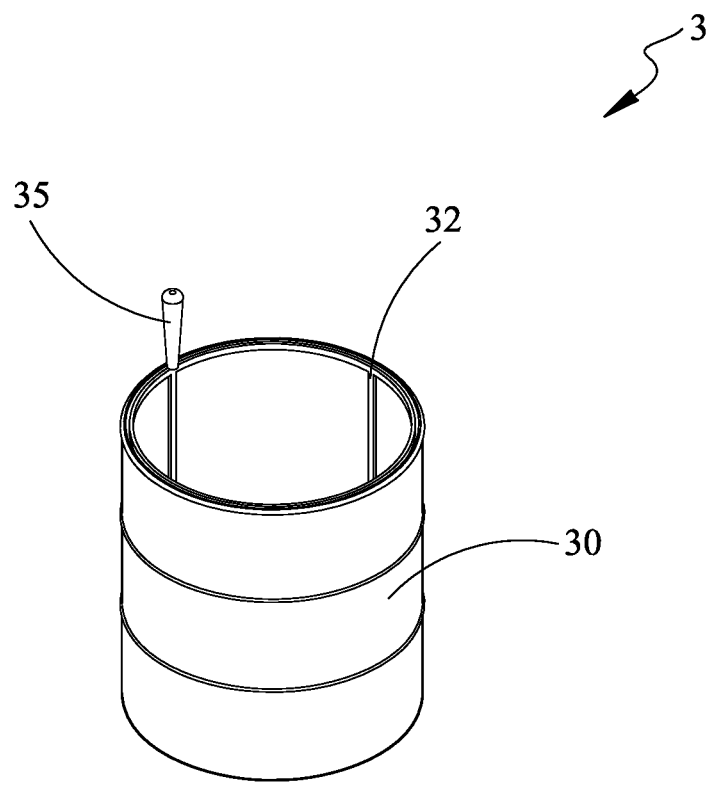
FIG. 7B is assembling drawing illustrating the powder sifting device according to the fifth embodiment according of the present invention.

Finally, please refer to the FIGS. 7A and 7B, that shows the explosion diagram and assembling drawing illustrating the powder sifting device according to the fifth embodiment of present invention. The description for the partial elements and the corresponding connection relationship that is the same as the previous powder sifting device mentioned above, will not be repeated for simplicity. The mainly difference therebetween is that the powder sifting device further includes a grip cover 35 fitting around the holding part 324, where the grip cover 35 is provided with an aperture 351 to correspond to the opening hole 3241 of the holding part 324. A user can hold the holding part 324 for the operation of rotation of the powder sifting device 3.

As mentioned above, the present invention has the advantages below:

1. The present invention is effort-saving while operating.
2. The present invention is convenient to use and easy-operation.
3. The rate of pouring the powder of the present invention is higher than the conventional powder sifting device.

The above description should be considered as only the discussion of the preferred embodiments of the present invention. However, a person skilled in the art may make various modifications to the present invention. Those modifications still fall within the spirit and scope defined by the appended claims.

What is claimed is:

1. A powder sifting device, comprising:
   a housing having a first opening communicating with a second opening on which a screen is provided to form a receiving space delimited by the first opening and the second opening; and
   a frame, that is received within the receiving space, having an upper frame, a lower frame and a connecting part connecting between the upper frame and the lower frame, the frame provided with a holding part at one side of the frame adjacent to the first opening and provided with a sweeping element which is a sweeping screen formed extending toward the center of the frame from the lower frame, and the sweeping element proximately covering on the screen at the other side of the frame, wherein the frame is driven by the holding part to rotate within the receiving space, and the sweeping element is moved along with the holding part to sweep over the screen.

2. The powder sifting device as claimed in claim 1, wherein the housing further comprises a handle provided on the outer surface of the housing.

3. The powder sifting device as claimed in claim 1, wherein the holding part is provided protruding from the upper frame, and the holding part has an opening hole on an upper side.

4. The powder sifting device as claimed in claim 1, further comprising a fixing member covering the housing and the upper frame.

5. The powder sifting device as claimed in claim 3, further comprising a grip cover fitting around the holding part.

6. The powder sifting device as claimed in claim 5, wherein the grip cover is provided with an aperture on a side to correspond the opening hole, and a locking member secures through the aperture and the opening hole.

7. The powder sifting device as claimed in claim 1, wherein the housing is provided with a junction part provided at a position that supports a coupling part, which being provided at the periphery of the screen, of the screen to form the receiving space.

\* \* \* \* \*

UNITED STATES PATENT AND TRADEMARK OFFICE
CERTIFICATE OF CORRECTION

PATENT NO. : 8,931,643 B2  
APPLICATION NO. : 13/934305  
DATED : January 13, 2015  
INVENTOR(S) : Yu Page 1 of 1

It is certified that error appears in the above-identified patent and that said Letters Patent is hereby corrected as shown below:

On Title Page:
Item (71), Applicant: Please correct "Chun-Hsiung Yu, Taipei (TW)"
to read -- Chun-Hsiung Yu, Taipei City, (TW) --

Item (72), Inventor: Please correct "Chun-Hsiung Yu, Taipei (TW)"
to read -- Chun-Hsiung Yu, Taipei City, (TW) --

Signed and Sealed this
Thirtieth Day of June, 2015

Michelle K. Lee
*Director of the United States Patent and Trademark Office*